H. R. HUNTLEY.
DETACHABLE CALK FOR HORSESHOES.
APPLICATION FILED DEC. 12, 1914.
1,186,788.
Patented June 13, 1916.
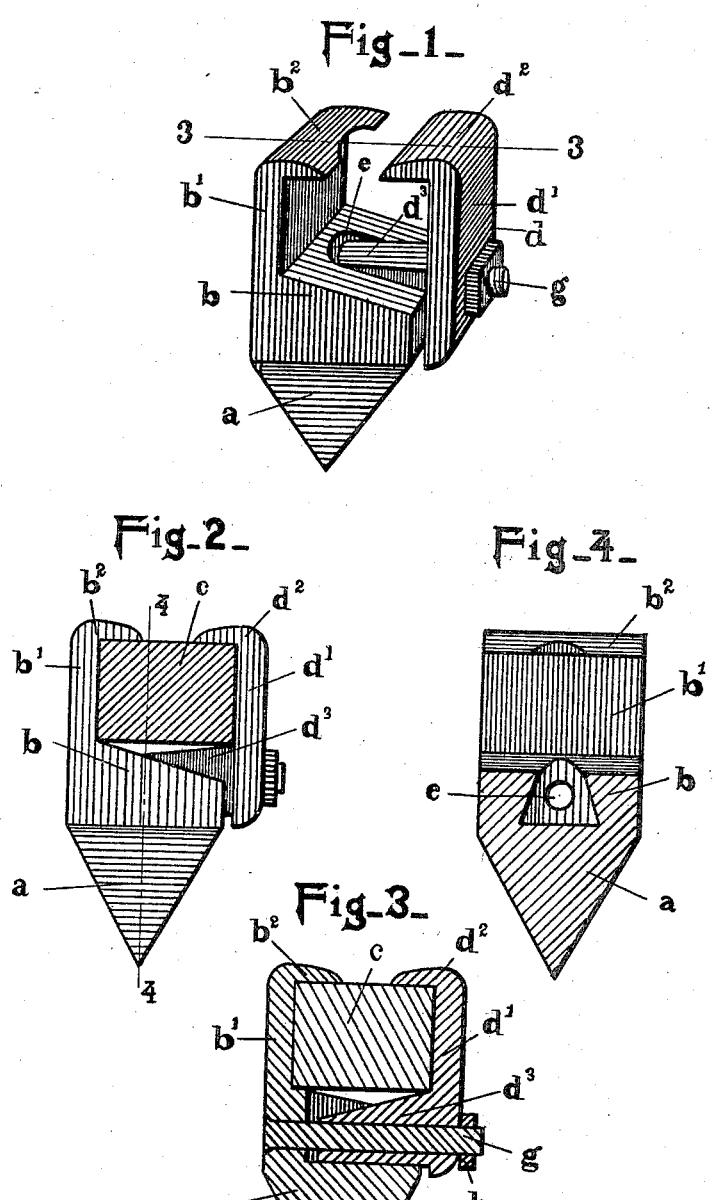
WITNESSES:
Edward A. Breed
Blanche C. Chartier
INVENTOR,
Herbert R. Huntley,
BY Allen + Daggett
ATTORNEYS

UNITED STATES PATENT OFFICE.

HERBERT R. HUNTLEY, OF NORTH SUDBURY, MASSACHUSETTS.

DETACHABLE CALK FOR HORSESHOES.

1,186,788.  Specification of Letters Patent.  Patented June 13, 1916.

Application filed December 12, 1914. Serial No. 876,964.

*To all whom it may concern:*

Be it known that I, HERBERT R. HUNTLEY, a citizen of the United States, residing at North Sudbury, in the county of Middlesex, in the State of Massachusetts, have invented a certain new and useful Improvement in Detachable Calks for Horseshoes, of which the following is a specification, reference being had to the accompanying drawings.

The immediate object of this invention is to provide an extremely simple, and reasonably cheap, calk that may be readily attached to, or removed from, horse shoes of ordinary construction without the aid of special tools or implements.

In order to explain my said invention clearly, I have provided the annexed drawings, in which—

Figure 1 is a perspective view of a calk embodying my present improvements and Fig. 2 is an end elevation of the same. Fig. 3 is a vertical, sectional, view taken on the line 3—3 of the Fig. 1, and Fig. 4 is a similar view taken on the line 4—4 of Fig. 2.

Referring to these drawings, the letter $a$ indicates the calk proper, the same being formed integral with a plate $b$ one of whose sides is extended upward as $b'$ and inward as at $b^2$, the plate $b$ and extension $b^2$ being spaced apart sufficiently to readily slip over the edge of a horse shoe, which latter is denoted by the reference letter $c$.

In opposition to the described member is a plate $d$ having one of its sides extended upward, as at $d'$; the upper portion of the same being projected inward, that is to say toward the extension $b^2$, as at $d^2$, the plate $d$ and the described projection $d^2$ being also spaced apart sufficiently to receive the edge portion of a horse shoe. Plate $b$ is cut away to provide an undercut or "dove-tail" cavity $e$ which is adapted to receive a correspondingly shaped extension $d^3$ carried by the plate $d$, the arrangement being such that, when the two companion members of the calk are assembled, as seen in Fig. 1 of the drawings, said members may be adjusted with respect to each other in order to embrace horse shoes of different widths. In order to clamp the said members upon the horse shoe, I have provided, as here illustrated, a bolt $g$ in the plate $b$ of such length that it will project through a hole in the companion member sufficiently to receive a nut $h$ which, when screwed home on bolt $g$, will bind the calk firmly upon the horse shoe.

As a further means for insuring a firm connection between the shoe and calk, I have beveled the upper edges of the plate $b$ and the extension $d^3$ so that the act of screwing home the nut $h$ will cause the said plate and extension to be drawn into close (wedging) contact with the horse shoe. When, however, it is necessary or desirable to remove the calk from the shoe, it may be accomplished readily by unscrewing the nut $h$ and rapping the calk members to jar them loose from the shoe.

The convenience of my described calk will be apparent; it may be cheaply produced and it renders it possible and convenient to remove worn calks and to substitute therefor sharp ones while on the road or, in fact, anywhere, which is a decided advantage over that type of detachable, or removable, calks which have to be drilled out, or chipped away, before they can be separated from the shoe.

Having thus described my invention I claim as new and wish to secure by Letters Patent:—

1. A detachable horse shoe calk, including two members, one having the calk proper and formed of a plate having a downwardly inclined upper surface, said plate also having a dovetail cavity opening upwardly through its upper inclined surface and through one end of said plate, a second plate having a dovetail tongue or extension received by said dovetail cavity, said tongue or extension having also a downwardly inclined upper surface, whose inclination is opposite to that of the aforesaid plate, and provided with a longitudinal hole, said plates having upwardly extending opposite extensions adapted to engage a horse shoe at edges thereof, and a connecting nut-equipped bolt projecting from one plate and extending through the hole of said tongue or extension of the other plate.

2. A detachable horseshoe calk, comprising two members that are slidably dovetailed together, and means for clamping said members upon the opposite edge portions of a shoe; said members being formed with inclined faces adapted to wedge upon said shoe.

HERBERT R. HUNTLEY.

Witnesses:
FRANK H. ALLEN,
MARION G. FERGUSON.

Copies of this patent may be obtained for five cents each, by addressing the "Commissioner of Patents, Washington, D. C."